(12) United States Patent
Groninga et al.

(10) Patent No.: US 10,730,622 B2
(45) Date of Patent: Aug. 4, 2020

(54) PERSONAL AIR VEHICLE WITH DUCTED FANS

(71) Applicant: Bell Helicopter Textron Inc., Fort Worth, TX (US)

(72) Inventors: Kirk L. Groninga, Keller, TX (US); John Lloyd, Arlington, TX (US); Daniel B. Robertson, Southlake, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 506 days.

(21) Appl. No.: 15/623,328

(22) Filed: Jun. 14, 2017

(65) Prior Publication Data

US 2018/0362160 A1 Dec. 20, 2018

(51) Int. Cl.
| | | |
|---|---|---|
| *B64C 25/10* | (2006.01) | |
| *B64C 27/20* | (2006.01) | |
| *B64C 39/02* | (2006.01) | |
| *B64C 29/00* | (2006.01) | |
| *B64C 9/00* | (2006.01) | |
| *B64C 13/04* | (2006.01) | |

(52) U.S. Cl.
CPC .............. *B64C 39/026* (2013.01); *B64C 9/00* (2013.01); *B64C 13/04* (2013.01); *B64C 25/10* (2013.01); *B64C 27/20* (2013.01); *B64C 29/0033* (2013.01)

(58) Field of Classification Search
CPC ..... B64C 29/0033; B64C 27/20; B64C 25/10; B64C 39/026
See application file for complete search history.

(56) References Cited

U.S. PATENT DOCUMENTS

| | | | |
|---|---|---|---|
| 4,498,645 A | 2/1985 | Hardy | |
| 5,115,996 A | 5/1992 | Moller | |
| 7,249,732 B2 | 7/2007 | Sanders, Jr. et al. | |
| 7,874,513 B1 | 1/2011 | Smith | |
| 8,393,564 B2 | 3/2013 | Kroo | |
| 8,485,464 B2 | 7/2013 | Kroo | |
| 8,496,200 B2* | 7/2013 | Yoeli | B64C 29/0025 244/17.25 |
| 8,579,227 B2 | 11/2013 | Burnham | |
| 8,720,814 B2 | 5/2014 | Smith | |

(Continued)

FOREIGN PATENT DOCUMENTS

| | | |
|---|---|---|
| DE | 102014115926 A1 | 5/2016 |
| EP | 3415423 A1 | 12/2018 |

(Continued)

OTHER PUBLICATIONS

EP Exam Report, dated Sep. 18, 2018, by the EPO, re EP Patent App No. 17185565.3.

(Continued)

*Primary Examiner* — Philip J Bonzell
*Assistant Examiner* — Tye William Abell
(74) *Attorney, Agent, or Firm* — Timmer Law Group, PLLC (57) ABSTRACT

In a first aspect, there is a personal air vehicle including a body having a forward portion, a central portion and an aft portion; a first ducted fan supported by the forward portion of the body; a second ducted fan supported by the aft portion of the body; and third and fourth ducted fans supported by the left and right sides of the body and pivotable relative to the body. An aspect provides a method of flying the personal air vehicle.

31 Claims, 8 Drawing Sheets

(56) References Cited

U.S. PATENT DOCUMENTS

| | | | |
|---|---|---|---|
| 8,833,692 B2* | 9/2014 | Yoeli | B64C 29/0025 244/23 A |
| 9,242,738 B2 | 1/2016 | Kroo | |
| 9,284,037 B2 | 3/2016 | Gabrielli et al. | |
| 9,511,859 B2 | 12/2016 | Keennon et al. | |
| 2006/0049304 A1* | 3/2006 | Sanders, Jr. | B64C 39/024 244/23 A |
| 2006/0226281 A1* | 10/2006 | Walton | B64C 29/0033 244/17.23 |
| 2008/0054121 A1* | 3/2008 | Yoeli | B64C 27/20 244/12.1 |
| 2010/0327122 A1* | 12/2010 | De Roche | B64C 39/026 244/221 |
| 2014/0158816 A1* | 6/2014 | DeLorean | B64C 29/0033 244/12.4 |
| 2018/0127094 A1* | 5/2018 | Zapata | G05D 1/0858 |
| 2019/0121371 A1* | 4/2019 | Russell | G05D 1/0022 |

FOREIGN PATENT DOCUMENTS

| | | | |
|---|---|---|---|
| WO | 2005072233 A2 | 8/2005 | |
| WO | WO-2016066848 A1 * | 5/2016 | B64C 29/0016 |

OTHER PUBLICATIONS

European Exam Report, dated Mar. 6, 2018, by the EPO, re EP Patent App No. 17185565.3.
European Search Report, dated Feb. 20, 2018, by the EPO, re EP Patent App No. 17185565.3.
EP Communication under Rule 71(3) EPC—Intent to Grant, by the EPO, dated Apr. 9, 2019, re EP Patent App No. 17185565.3.
David McNally, ARL Public Affairs; Army flies 'hoverbike' prototype; Jan. 17, 2017; www.army.mil/article/180682.
Shivali Best; Would you ride a Flying motorbike? BMW unveils a futuristic concept hover vehicle based on Lego; Feb. 20, 2017; http://www.dailymail.co.uk/sciencetech/article-4241662/BMW-unveils-flying-motorbike-concept-based-Lego.html.
Rod Ardehali; The world's first Hoverbike is here! Developers claim it's so simple to fly you don't need any experience before taking to the sky; Feb. 20, 2017; http://www.dailymail.co.uk/news/article-4242248/World-s-fully-manned-hoverbike-tested-warehouse.html.
Decision to Grant, dated Oct. 10, 2019, by the EPO, re EP Patent App No. 17185565.3.

* cited by examiner

PERSONAL AIR VEHICLE WITH DUCTED FANS

BACKGROUND

Technical Field

The present disclosure relates to a personal air vehicle. More particularly, the present disclosure relates to an improved personal air vehicle with ducted fans.

Description of Related Art

A personal air vehicle (PAV) or personal aerial vehicle is an alternative to automobile and conventional aircraft or hovercraft transportation. A PAV is a small-scale aircraft or hovercraft that does not require a conventional runway or airport for landing and takeoff. PAVs are designed to be flown by an operator as opposed to a pilot and can provide "door-to-door" transportation solutions.

SUMMARY

A first aspect provides a personal air vehicle including a body having a forward portion, a central portion and an aft portion; a first ducted fan supported by the forward portion of the body; a second ducted fan supported by the aft portion of the body; and third and fourth ducted fans supported by the left and right sides of the body and pivotable relative to the body.

In an embodiment, the third and fourth ducted fans are pivotable relative to the body in a horizontal orientation for a hover mode.

In another embodiment, the third and fourth ducted fans are pivotable relative to the body in a non-horizontal orientation. In an embodiment, the non-horizontal orientation is in a forward mode. In another embodiment, the non-horizontal orientation is in a reverse mode.

In an exemplary embodiment, the third and fourth ducted fans are disposed on the central portion of the body.

In yet another embodiment, at least one of the third ducted fan and the fourth ducted fan is adjacent to a bottom surface of the body.

In still another embodiment, the third ducted fan and the fourth ducted fan are foldable.

In an embodiment, the vehicle is configured to generate roll control by selectively differentiating a collective power in the third and fourth ducted fans, in any combination so as to produce a desired differential in thrust angle between the right side and the left side of the vehicle.

In an exemplary embodiment, at least one of the first ducted fan, the second ducted fan, the third ducted fan, and the fourth ducted fan generates a variable thrust.

In one embodiment, the first ducted fan and the second ducted fan are each rotatable about an axis substantially perpendicular to the vehicle longitudinal axis.

In an embodiment, the axes of rotation of the third ducted fan and the fourth ducted fan are each pivotable about a pivot axis.

In still another embodiment, the vehicle is wingless.

In yet another embodiment, the vehicle is configured to generate pitch and yaw control by selectively differentiating a collective power in the first ducted fan and the second ducted fan, in any combination so as to produce a desired differential in thrust angle between the forward and aft portions of the vehicle.

In an embodiment, at least one of the first ducted fan and the second ducted fan further including a pair of air directing slats for providing yaw control of the vehicle.

In one embodiment, the vehicle further includes a flight control system operable to change at least one operating condition of at least one of the first, second, third, and fourth ducted fans; and an operator control device in communication with the flight control system and operable to receive a command from an operator.

In yet another embodiment, the operator control device is a pair of handle bar assemblies. In an embodiment, the flight control system further includes a hover hold mode.

In an embodiment, the body further includes an operator area and a secondary area.

In some embodiments, the secondary area can support at least one of the following: a passenger, cargo, a weapon, equipment, and combinations thereof.

In an embodiment, the secondary area is adjacent to the operator area.

In an exemplary embodiment, the secondary area is reachable by the operator.

In one embodiment, the operator area includes a straddle seat for the operator.

In still another embodiment, the body further includes a retractable landing gear assembly.

In an example, the landing gear assembly includes a base and a pair of retractable arms extending from the base for contacting the ground.

In a second aspect, there is a method of flying a personal air vehicle, the method including providing the vehicle described herein; and producing using at least the first ducted fan and the second ducted fan a vertical thrust to cause the vehicle to ascend.

In an embodiment, the method includes pivoting a pair of air directing slats on at least one of the first ducted fan and the second ducted fan to provide yaw control of the vehicle.

An embodiment of the method includes producing using the third ducted fan and the fourth ducted fan a vertical thrust to cause the vehicle to ascend.

In one embodiment, the method includes producing using the third ducted fan and the fourth ducted fan a forward thrust to cause the vehicle to move forward.

In still another embodiment, the method includes producing using the third ducted fan and the fourth ducted fan a reverse thrust to cause the vehicle to move rearward.

In an exemplary embodiment, the method includes pivoting at least one of the third and fourth ducted fans to control at least one of the roll and yaw of the vehicle.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the apparatus and method are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

A personal air vehicle using ducted fans is schematically illustrated and generally designated 10 in FIGS. 1-4. Personal air vehicle (PAV) 10 is designed to be a hoverbike that can be used to carry one, two, or more passengers, cargo, and/or data over a variety of terrains. PAV 10 is capable of operating in various flight modes similar to a helicopter including, but not limited to, a vertical landing and takeoff mode, a forward mode, a reverse mode, and a hover hold mode. The forward and reverse modes can be considered a forward flight mode and reverse flight mode, respectively.

PAV 10 can fly in an out-of-ground effect (OGE) and/or an in-ground effect (IGE) sufficient to maneuver over and/or around obstacles. In further embodiments, PAV 10 can fly at altitudes from about 1 to about 9,500 feet above the ground. In some embodiments, PAV 10 can fly at altitudes from about 30 to about 50 feet above the ground. In particular embodiments, PAV 10 can fly at altitudes from about 6,000 to about 9,500 feet above the ground.

It should be appreciated that PAV 10 is merely illustrative of a variety of manned wingless aircraft or hovercraft that can implement the embodiments disclosed herein. Wingless aircraft means an aircraft without laterally extending wing surfaces that provide lift during operation of the aircraft. Other aircraft or hovercraft implementations can include unmanned aerial vehicles (UAV) that can be used for the transport of people, cargo, and/or data for military, commercial, and residential purposes, to name a few examples. In manned embodiments, operator means the person riding and controlling PAV 10. In unmanned embodiments, operator means the person remotely controlling PAV 10.

FIGS. 1, 2A-2C, and 4 depict three mutually orthogonal directions X, Y, and Z forming a three-dimensional frame of reference XYZ. Longitudinal axis X corresponds to the roll axis that extends through the center of PAV 10 in the fore and after directions. Transverse axis Y is perpendicular to longitudinal axis X and corresponds to the pitch axis (also known as a control pitch axis or "CPA"). The X-Y plane is considered to be "horizontal." Vertical axis Z is the yaw axis and is oriented perpendicularly with respect to the X-Y plane. The X-Z plane and Y-Z plane are considered to be "vertical."

Referring to FIGS. 1-4, PAV 10 includes a body 12 as the main support or fuselage. Body 12 can hold the operator and/or cargo as well as support front and rear ducted fans 50, 52 and side tilting ducted fans 60, 62. Fans 50, 52, 60, 62 can be collectively powered and manipulated to selectively control direction, thrust, and lift of PAV 10. The side tilting ducted fans 60, 62 are each pivotable about a pivot axis P generally perpendicular to the transverse axis Y of body 12.

Figure 1:
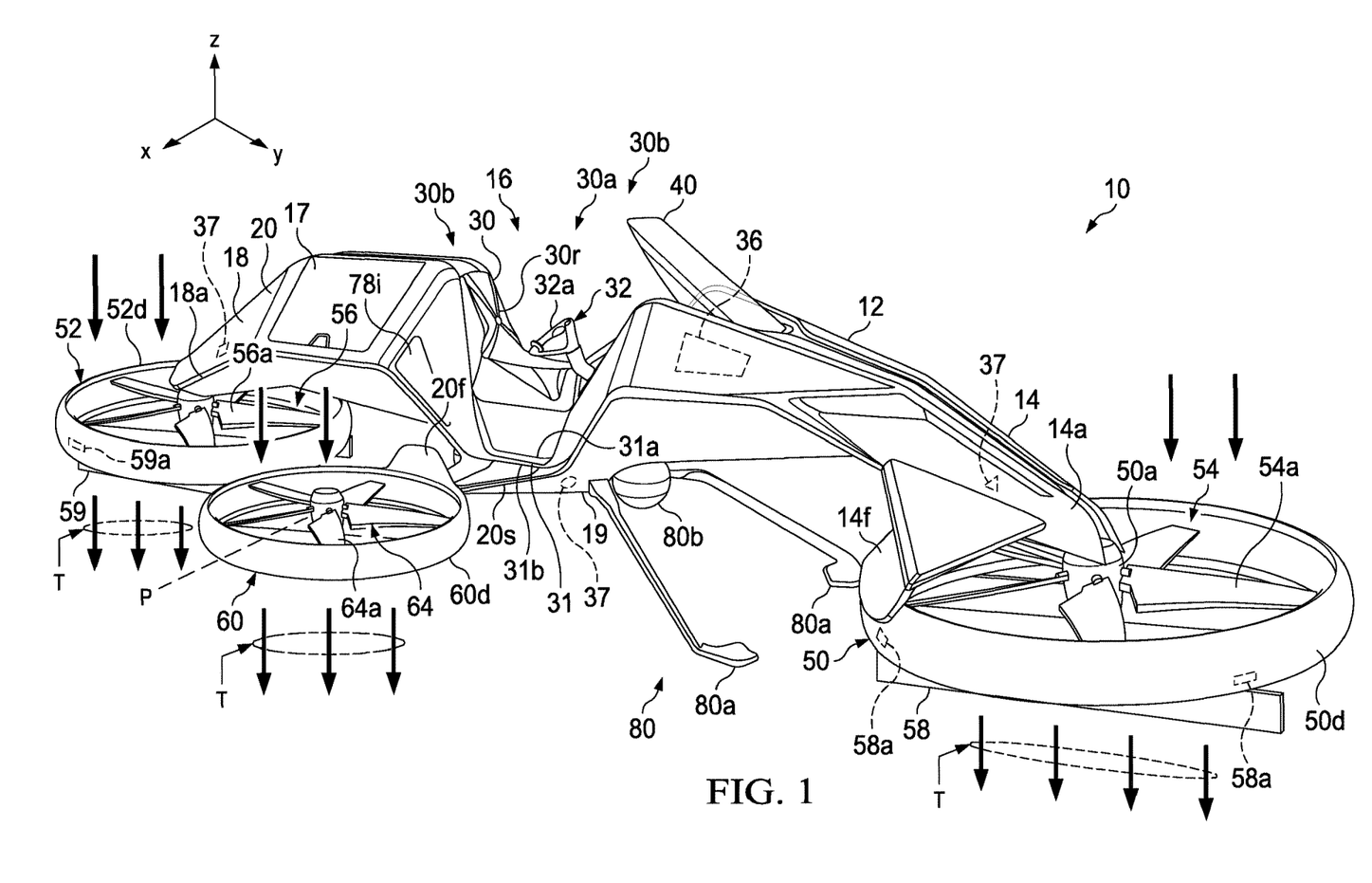
FIG. 1 is a perspective view of a personal air vehicle in hover mode in accordance with exemplary embodiments of the present disclosure.
Figure 2A:
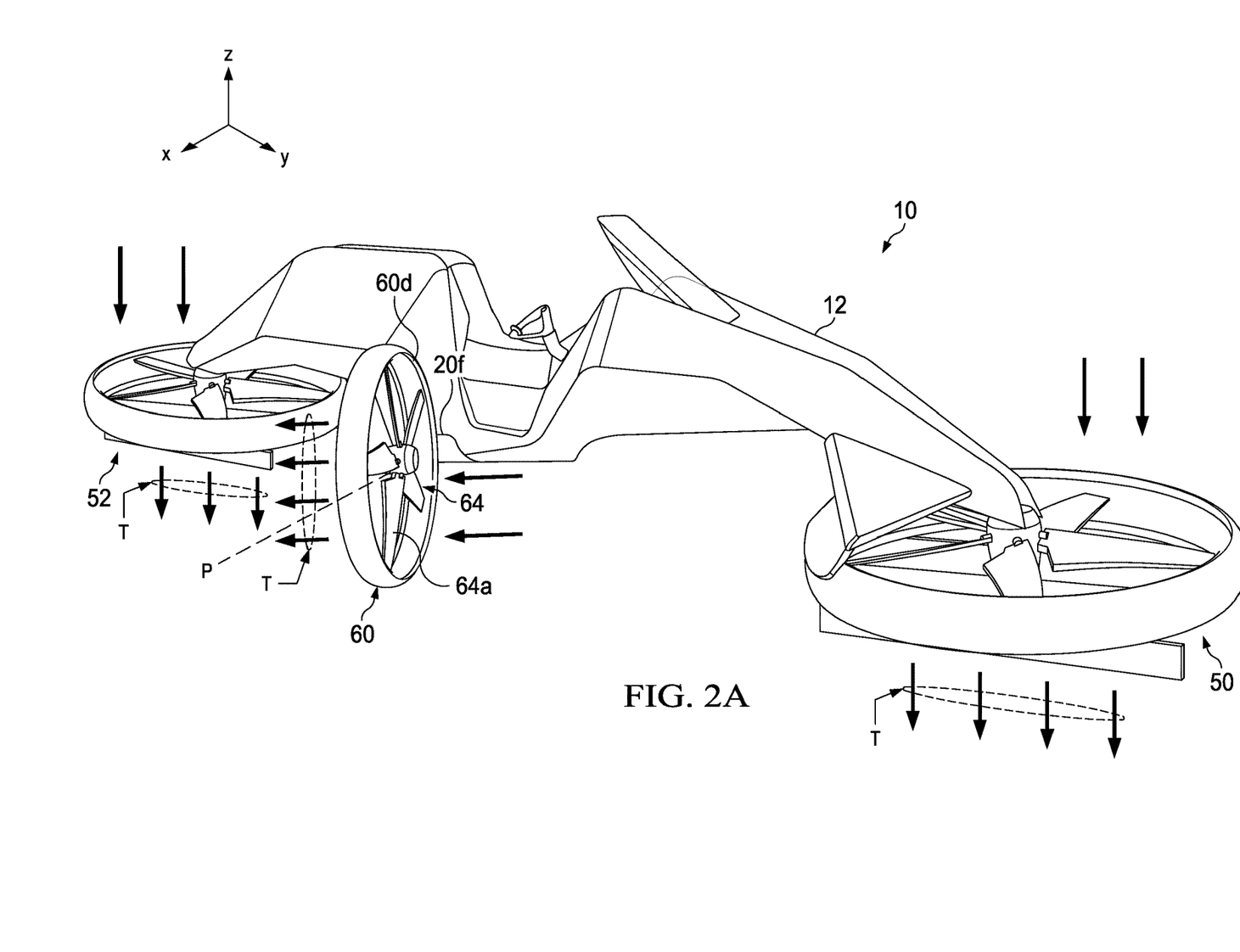
FIGS. 2A-2C are simplified representations of the personal air vehicle in FIG. 1 in various flight modes, in accordance with exemplary embodiments of the present disclosure.
Figure 2B:
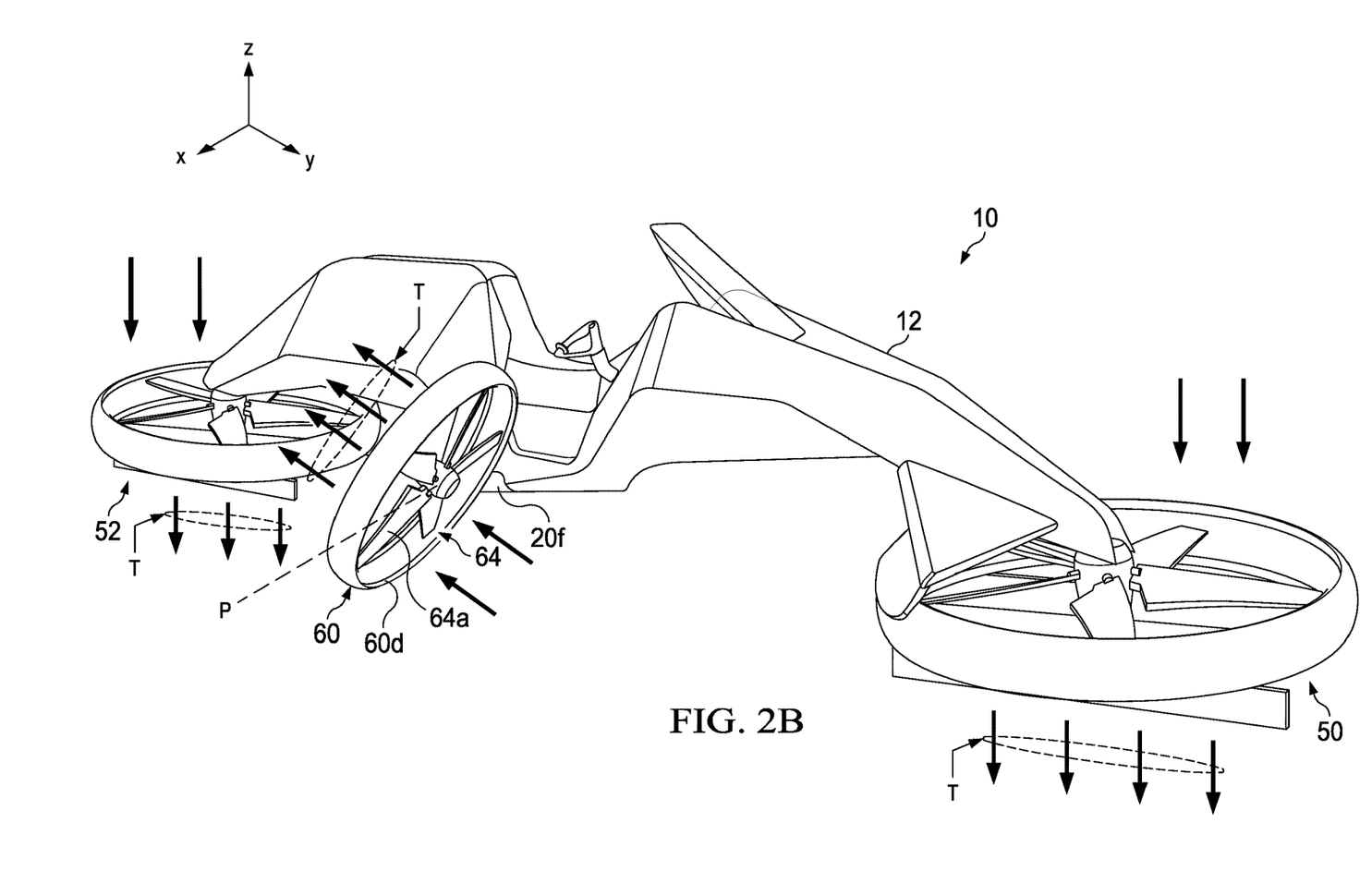
Figure 2C:
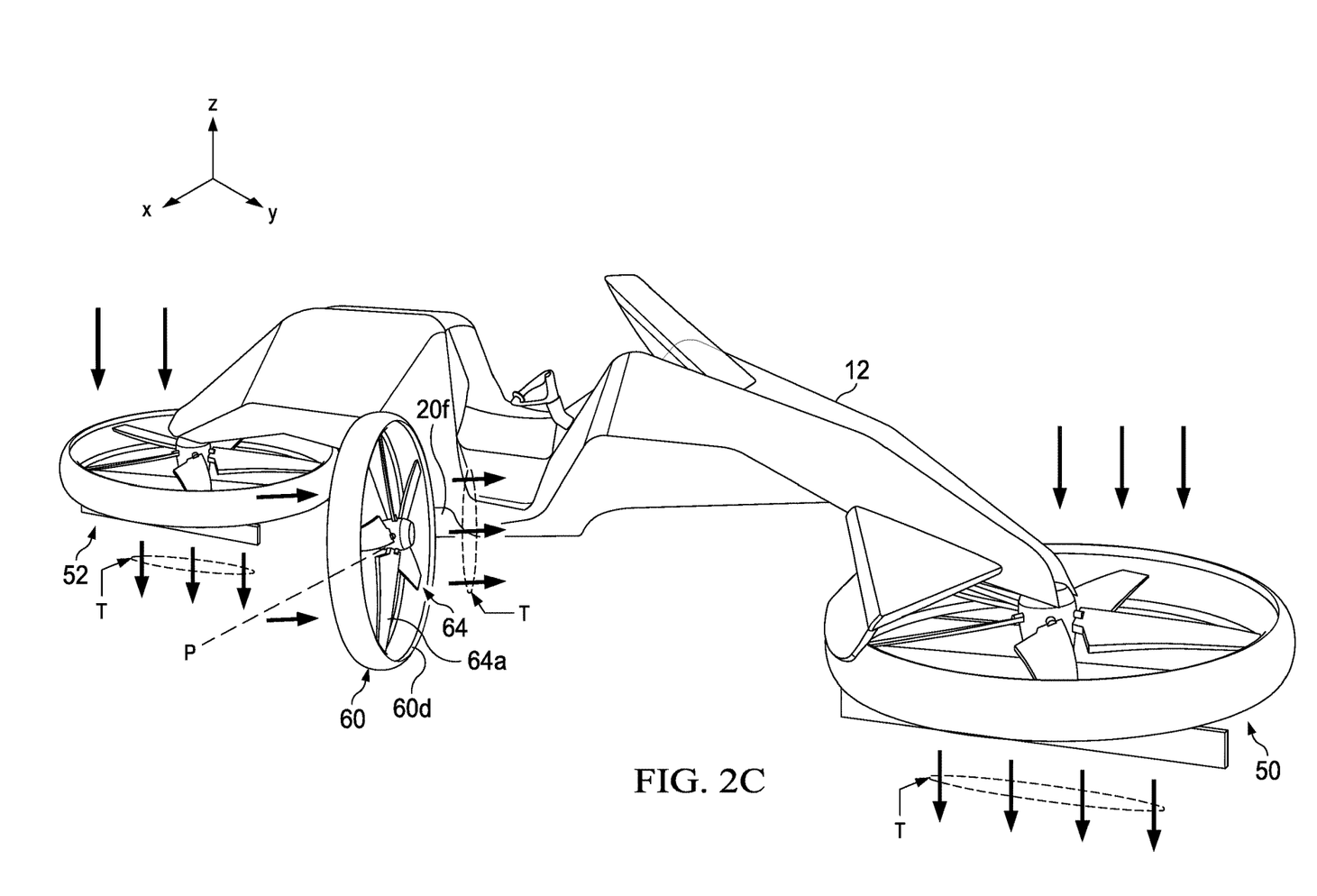
Figure 3:
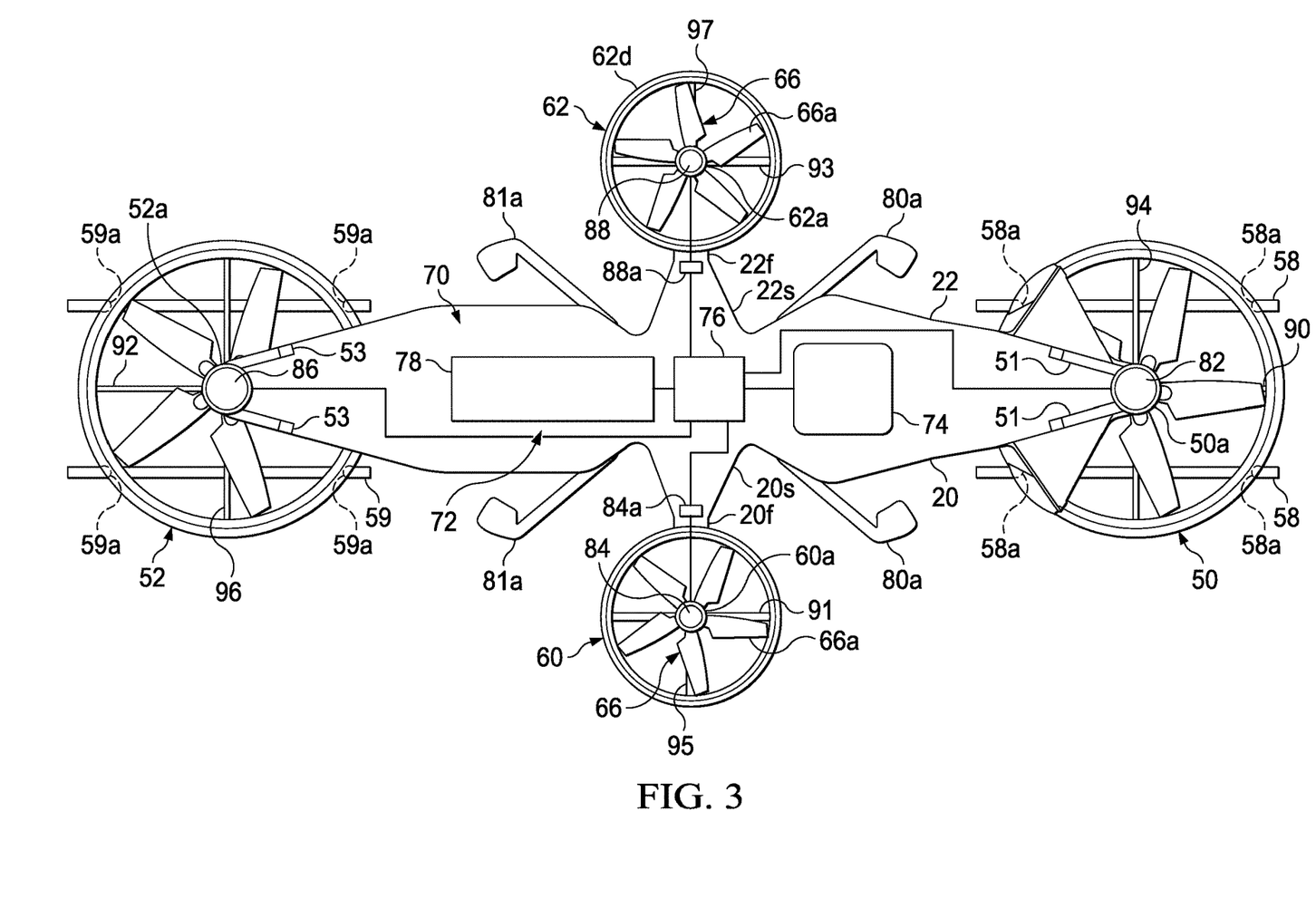
FIG. 3 is a schematic top view illustration of a power source for the personal air vehicle in FIG. 1 in accordance with exemplary embodiments of the present disclosure.
Figure 4:
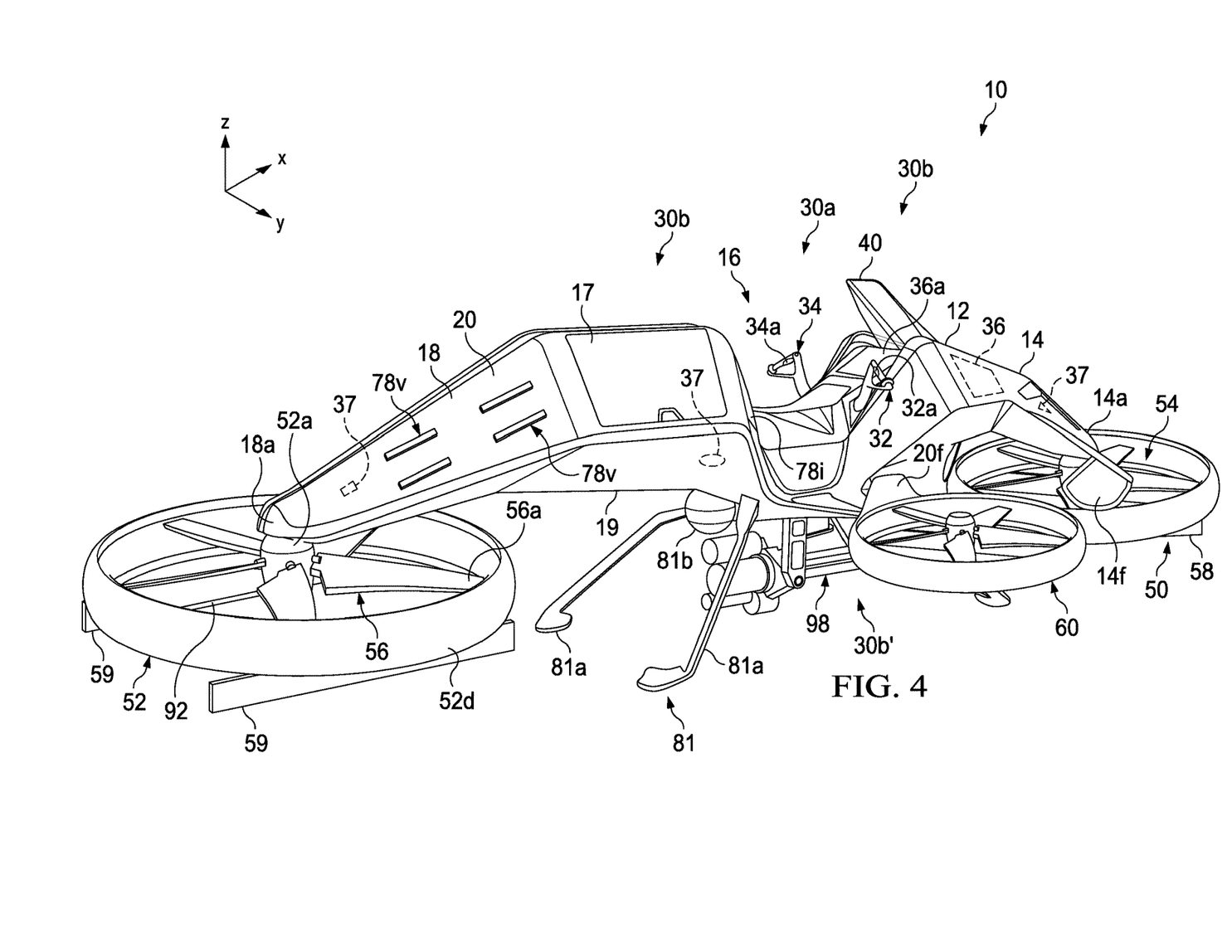
FIG. 4 is a rear perspective view of the personal air vehicle in FIG. 1 in accordance with an exemplary embodiment of the present disclosure.

Each of the tilting ducted fans 60, 62 can be positioned independently between horizontal position, shown in FIGS. 1 and 3-4, and the vertical positions, shown in FIGS. 2A-2C. In the interest of clarity, only tilting ducted fan 60 will be discussed in detail. However, one of ordinary skill in the art will understand that the form and function of tilting ducted fan 62 will be fully known from the benefit of the disclosure herein related to the tilting ducted fan 60. Referring now to FIGS. 1 and 3-4, PAV 10 is in a vertical takeoff and landing mode that can be considered to also be a hover mode with the side tilting ducted fan 60 in a generally horizontal position and generating a downward thrust T (thrust is in a downward direction to propel PAV upward). FIG. 2A shows PAV 10 in a forward flight mode such that tilting ducted fan 60 is in a non-horizontal position and generating a forward thrust T (e.g., thrust is in an aft direction to propel PAV 10 forward). FIG. 2B illustrates side tilting ducted fan 60 in a non-horizontal position (e.g., angled about the pivot axis P) between forward and hover modes, which can be used for roll and yaw control during operation of PAV 10. In a reverse mode, shown in FIG. 2C, tilting ducted fan 60 is in a non-horizontal position. To achieve reverse mode, in one embodiment, tilting ducted fan 60 is pivoted about the pivot axis P to generate thrust T in a forward direction to propel PAV 10 rearward (opposite to that shown in FIG. 2A). In another embodiment, shown in FIG. 2C, the rotation direction of the plurality of blade assemblies 64 can be reversed (e.g., opposite from the rotation direction of the plurality of blades in FIG. 2A) such that thrust T generated by tilting ducted fan 60 is in a forward direction to propel PAV 10 rearward.

Body 12 includes a forward portion 14, a central portion 16, and an aft portion 18. The forward portion 14 includes a forward end 14a and the aft portion 18 includes an aft end 18a. The forward end 14a and the aft end 18a are longitudinally spaced-apart ends defining a vehicle transverse axis Y. PAV 10 has a right side 20 and a left side 22.

Central portion 16 of the body 12 supports at least one straddle-type seat 30; a pair of handle bar assemblies 32, 34; flight control system display panel 36a; and windshield 40. Seat 30 is designed to be ridden by an operator similar to a motorcycle. Seat 30 can be disposed in a recess in the body 12 that includes a restraint system 30r. Restraint system 30r can be a four or five-point quick release harness for securing the operator to the body 12 during operation. A pair of footwells 31 are laterally positioned on opposite sides of the seat 30 and include laterally spaced-apart inner 31a and outer edges 31b. In other embodiments, the seat 30 can be disposed generally or partially within an aerodynamic protective enclosure such that seat 30 forms a cockpit in the body 12.

It will be appreciated that the contemplated embodiment is configured showing one seat 30 to provide an operator area 30a. In other embodiments, the body 12 can include a secondary area 30b for transporting at least one of the following: a passenger, cargo, a weapon, equipment, and combinations thereof. In an embodiment, the secondary area 30b is adjacent to the operator (e.g., next to, in front of, behind, and/or below the operator area 30a). In an exemplary embodiment, the secondary area 30b is reachable by the operator.

A pair of handle bar assemblies 32, 34 is operably coupled to the body 12 on each of the right and left sides 20, 22. The pair of handle bar assemblies 32, 34 can also be operably coupled to the front and rear fans 50, 52 and side fans 60, 62. As used herein, the term "coupled" may include direct or indirect coupling by any means, including moving and non-moving mechanical connections. In one embodiment, manipulating handle switches 32a, 34a using thumb or finger controls can control throttle of the vehicle 10. In an embodiment, turning of the handle bar assemblies 32, 34 controls the pivoting of a pair of air directing slats 58, 59 and/or tilting ducted fans 60, 62 so as to provide yaw control for PAV 10.

Due to the many variables involved in the control of flight of PAV 10, a computer-controlled flight control system 36 automates many of the functions required for safe, efficient operation. Flight control system 36 can actuation control components of PAV 10 in response to control inputs generated by one or more of the following: (1) an on-board operator; (2) an operator located remote from the vehicle; (3) a partially autonomous system, such as an auto-pilot; and (4) a fully autonomous system, such as in an UAV operating in a fully autonomous manner. Flight control system 36 includes software-implemented flight control methods for generating responses to the inputs that are appropriate to a particular flight or mission regime. In an embodiment, flight control system 36 includes a fly-by-wire flight control system. In one embodiment, flight control system 36 includes a hover mode such that can include an automatic hover hold mode and/or position hold mode; for example, and not limitation, vehicle 10 maintains a hover position above the ground at a desired location (e.g., the operator can be in a "hands free" hover). In an embodiment, hover mode can be maintained without hand control by the operator or is otherwise "hands-free." Flight control system 36 facilitates operation of PAV 10 by the operator. In one embodiment, flight control system 36 permits PAV 10 to be flown by an operator with minimal pilot skills. Flight control system 36 can advantageously reduce or minimize pilot induced oscillations.

Flight control system 36 can receive inputs from the operator, control components, and/or sensors. In one embodiment, the flight control system 36 can receive inputs from control components. In an embodiment, the flight control system 36 receives inputs from switches 32a, 34a disposed on the handle bar assemblies 32, 34 and/or inputs from movement of the handle bar assemblies 32, 34. In some implementations, the flight control system 36 receives inputs from a pair of pedal assemblies disposed in the footwells 31. In other embodiments, the flight control system 36 can receive voice and other inputs from the operator. It will be appreciated that in some embodiments, the body 12 can include and the flight control system 36 can receive inputs from at least one of the following control components: a steering wheel, a brake pedal, a gas pedal, a gear shifter, a stick, a lever, an engine throttle, and yaw pedals. A plurality of sensors 37 can be disposed on the forward portion 14, central portion 16, and/or aft portion 18 of the body 12 to detect various physical parameters (e.g., gyro sensors, acceleration sensors).

Flight control system 36 can be displayed on panel 36a and/or projected onto or into the windshield 40 so as to be within the operator's field of vision when operating vehicle 10. Panel 36a can be arranged in front of, adjacent to, and/or above the operator in order to be substantially accessible during operation. Panel 36a can be a touch-screen instrument panel that replaces the plurality of instruments, dials, gauges, and screens typically utilized on the console of an aircraft or automobile. Flight control system panel 36a can include instruments and mission related displays of information such as, but not limited to, speed, distance traveled, fuel gauge, vehicle position, vehicle orientation, weapons systems, radar controls, electronic jamming, and combinations thereof. In an embodiment, flight control system 36 can be displayed on a panel 36a remote from PAV 10 (e.g., on operator's watch, gear, helmet and/or at a flight control center).

Windshield 40 has an aerodynamic shape and is supported by the body 12. In some embodiments, windshield 40 can be constructed of a bullet resistant transparent material.

PAV 10 can, for example, be coupled to and controlled by a drive system 70 connected to a power source 72. A removable panel 17 in the body 12 can provide access to the drive system 70 and other operational systems. Drive system 70 can be an electric, hydraulic, and/or a conventional mechanical drive system.

In one embodiment, shown in FIG. 3, power source 72 includes a battery 74, a generator 76, and a combustion engine 78. Power source 72 provides electrical power to electric motors 82, 84, 86, 88 associated with the front and rear ducted fans 50, 52 and side tilting ducted fans 60, 62 for controlling direction, collective lift, and speed of the respective rotor hub assemblies and blade assemblies. Electric motors 82, 86 can be located within the respective hub 50a, 52a for the front and rear ducted fans 50, 52. Electric motors 84, 88 can be located within the respective hub 60a, 62a for the side ducted fans 60, 62. Air intake ducts 78i can be configured to direct airflow to combustion engine 78 during operation. Exhaust ports 78v can be disposed in the aft portion 18 and can be configured to selectively feed hot air away from the combustion engine 78 during operation.

Each of the front and rear ducted fans 50, 52 is coupled to body 12 and can generate a variable thrust. Front ducted fan 50 is disposed on the forward portion 14 and can include a flange 14f that can act as a guard to prevent the operator (e.g., a hand and/or foot) from coming into direct contact with ducted fan 50 during operation. In an embodiment, front ducted fan 50 is rigidly attached to the forward end 14*a* of the body 12 at the hub 50*a*. Rear ducted fan 52 is disposed on the aft portion 18 at hub 52*a*. In an embodiment, rear ducted fan 52 is rigidly attached to the aft end 18*a* of body 12. A suspension member 51, 53 can be fixedly mounted in the forward and aft portions 14, 18 of the body 12 to provide support for the motors 82, 86, respectively, during operation. In an embodiment, at least one of the suspension members 51, 53 can be a stator member.

Each of the ducted fans 50, 52 includes a duct 50*d*, 52*d* that surrounds, or partially encloses, rotor hub assemblies 54, 56 from which a plurality of blade assemblies 54*a*, 56*a* radially extend and rotate therein, respectively. Rotational speed of the plurality of blade assemblies 54*a*, 56*a* can be manipulated to selectively control direction, thrust, and lift of PAV 10. Indeed, in an embodiment, the rotational speed of the plurality of blade assemblies 54*a*, 56*a* may be independently controlled from one another to allow for different thrusts by each ducted fan 50, 52. In another embodiment, the rotor speed of blade assemblies 54*a* of ducted fan 50 may be higher or lower than the rotor speed of blade assemblies 56*a* of ducted fan 52 such that the thrusts generated by each ducted fan 50, 52 differ from one another so as to provide control of the vehicle along the pitch axis Y. In one embodiment, forward and rear ducted fans 50, 52 rotate in opposite directions from one another for torque balancing of PAV 10. An embodiment provides that forward and rear ducted fans 50, 52 are variable rpm ducted fans.

In an embodiment, each front and rear ducted fan 50, 52 can include a pair of air directing slats 58, 59, respectively, that can be pivoted by to provide for directional control of the airflow exiting the respected ducted fan 50, 52. Each air directing slat 58, 59 can include a slat actuator 58*a*, 59*a* disposed adjacent to and/or partially within the respective duct 50*d*, 52*d* for pivoting the particular slat 58, 59. Each pair of air directing slats 58, 59 can be independently controlled and may be pivoted such that thrust generated by the forward and rear ducted fans 50, 52 has a left or right component, thereby providing yaw control of the vehicle 10.

Each of the side tilting ducted fans 60, 62 is pivotably coupled to body 12 and can generate a variable thrust. Side tilting ducted fans 60, 62 can operably connected to side 20, 22, respectively, or other surface of the body 12 in the central portion 16 of the body 12. In an embodiment, right and left sides 20, 22 each include a laterally extending support member 20*s*, 22*s* that is operably connected to the respective tilting ducted fan 60, 62. The outer end of each support member 20*s*, 22*s* can include a flange 20*f*, 22*f* extending vertically that can act as a safety guard to prevent the operator (e.g., a hand and/or foot) from coming into direct contact with ducted fan 60, 62 during operation. Each of tilting ducted fans 60, 62 includes a duct 60*d*, 62*d* that surrounds, or partially encloses, rotor hub assemblies 64, 66 from which a plurality of blade assemblies 64*a*, 66*a* radially extend, respectively.

Side tilting ducted fans 60, 62 can each be independently pivoted about pivot axis P respectively by actuators 84*a*, 88*a*. Each of actuators 84*a*, 88*a* may be a linear actuator, rotary actuator, or still another type of actuator that may be powered hydraulically, electrically or still otherwise powered by power source 72. In an exemplary embodiment, each actuator 84*a*, 88*a* can be disposed in the respective body support members 20*s*, 22*s* and/or partially disposed within body 12.

Rotational speed of the plurality of blade assemblies 64*a*, 66*a* can be manipulated to selectively control direction, thrust, and lift of PAV 10. In an embodiment, the rotational speed of the plurality of blade assemblies 64*a*, 66*a* may be independently controlled from one another to allow for different thrusts by each ducted fan 60, 62. In one embodiment, the rotor speed of blade assemblies 64*a* of ducted fan 60 may be higher or lower than the rotor speed of blade assemblies 66*a* of ducted fan 62 such that the thrusts generated by each ducted fan 60, 62 differ from one another so as to provide control of the vehicle along the roll axis X. In one embodiment, right tilting ducted fan 60 and left tilting ducted fan 62 rotate in opposite directions from one another for torque balancing of PAV 10.

As shown in FIG. 3, each of the ducted fans 50, 52, 60, 62 also includes vertical support 90, 91, 92, 93, and horizontal support 94, 95, 96, 97, which can provide structural support to the respective rotor hub assemblies 54, 56, 64, 66.

Each of the ducts 50*d*, 52*d*, 60*d*, 62*d* may provide protection for the components of the ducted fans 50, 52, 60, 62 including the respective rotor hub assemblies and blade assemblies. Moreover, each of ducts 50*d*, 52*d*, 60*d*, 62*d* can have an airfoil or other aerodynamically efficient shape. Ducts 50*d*, 52*d*, 60*d*, 62*d* may also provide lift, or thrust, augmentation due to the pressure differential provided by the duct structure during flight. In some embodiments, at least one of the ducted fans 50, 52, 60, 62 includes more than one rotor hub assemblies.

Landing gear assemblies 80, 81 can be included on vehicle 10. Landing gear assemblies 80, 81 are operably connected to the bottom 19 of body 12 for contacting with the ground. Each landing gear assembly 80, 81 are formed of a pair of retractable arms 80*a*, 81*a* extending from a base 80*b*, 81*b*. Each base 80*b*, 81*b* has an actuator that can retract and deploy arms 80*a*, 81*a*. In a particular embodiment, the arms 80*a*, 81*a* are retracted such that they are adjacent to the bottom surface 19 of body 12. In an embodiment, the landing gear assemblies 80, 81 are ganged together to provide for even retraction and deployment. In another embodiment, landing gear assemblies 80, 81 can include a flotation system for landing on water.

There are numerous secondary areas on vehicle 10 that can be used for example, but not limitation, passengers, cargo, weapons, equipment, and/or combinations thereof. Referring to FIG. 1, there is a secondary area 30*b* adjacent to the operator area 30*a*. It should be appreciated that the secondary area 30*b* may be located in a wide variety of locations on or in the body 12, e.g., the top, bottom, front, back, and sides of the body 12. In an embodiment, shown in FIG. 4, there is a secondary area 30*b'* disposed on the bottom 19 of the body 12 for mounting a weapon 98 thereon. Weapon 98 can be operably controlled by at least the flight control system 36. In other embodiments, body 12 can have an extended length such that the secondary area 30*b'* has a sufficient length and width for at least one of the following: passengers, cargo, weapons, equipment, and/or combinations thereof. In some embodiments, the secondary area can be located on and/or in the forward portion 14, central portion 16, and aft portion 18 of the vehicle 10.

Figure 5A:
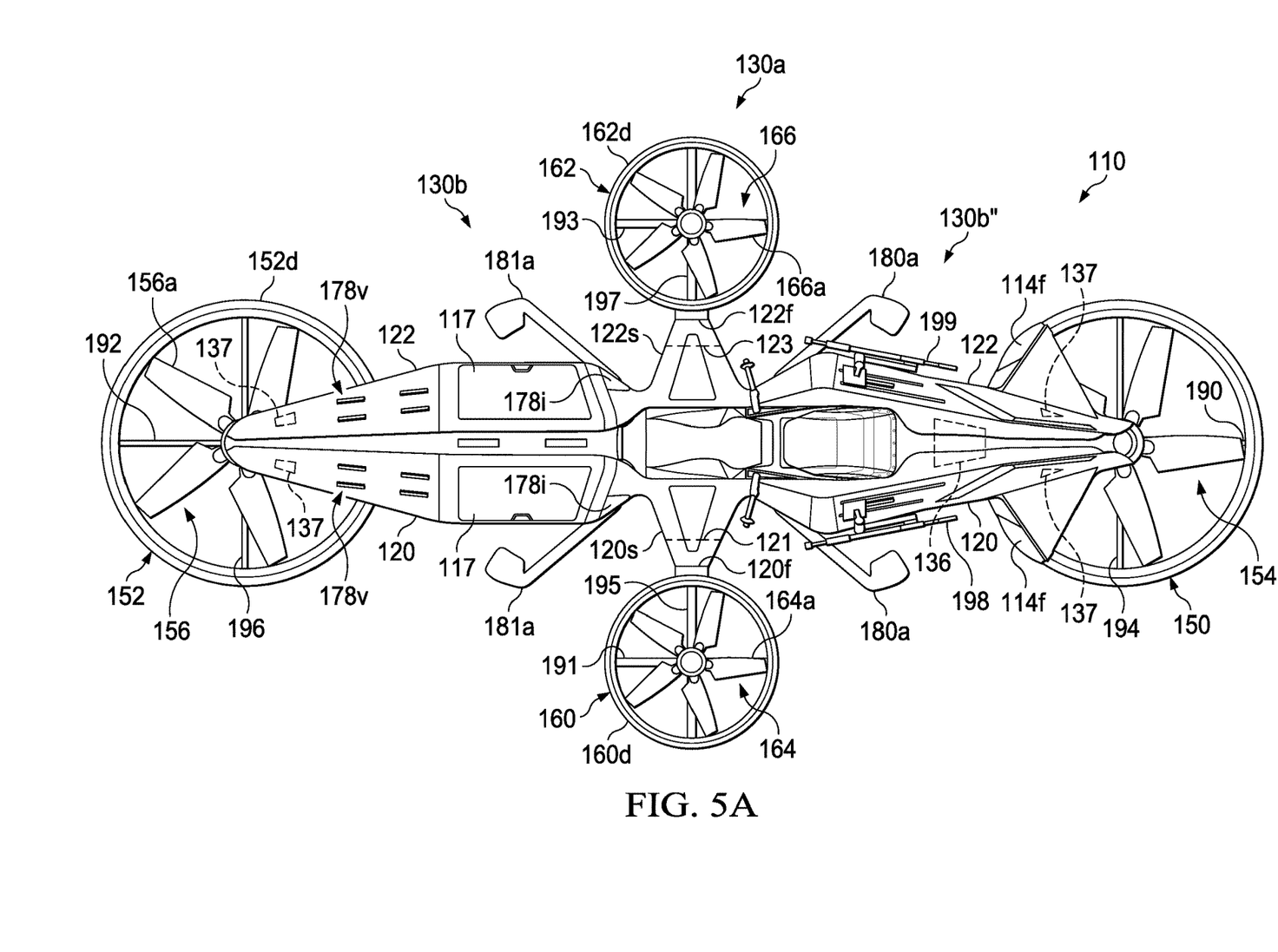
FIG. 5A is a top view of a personal air vehicle in hover mode in accordance with exemplary embodiments of the present disclosure.
Figure 5B:
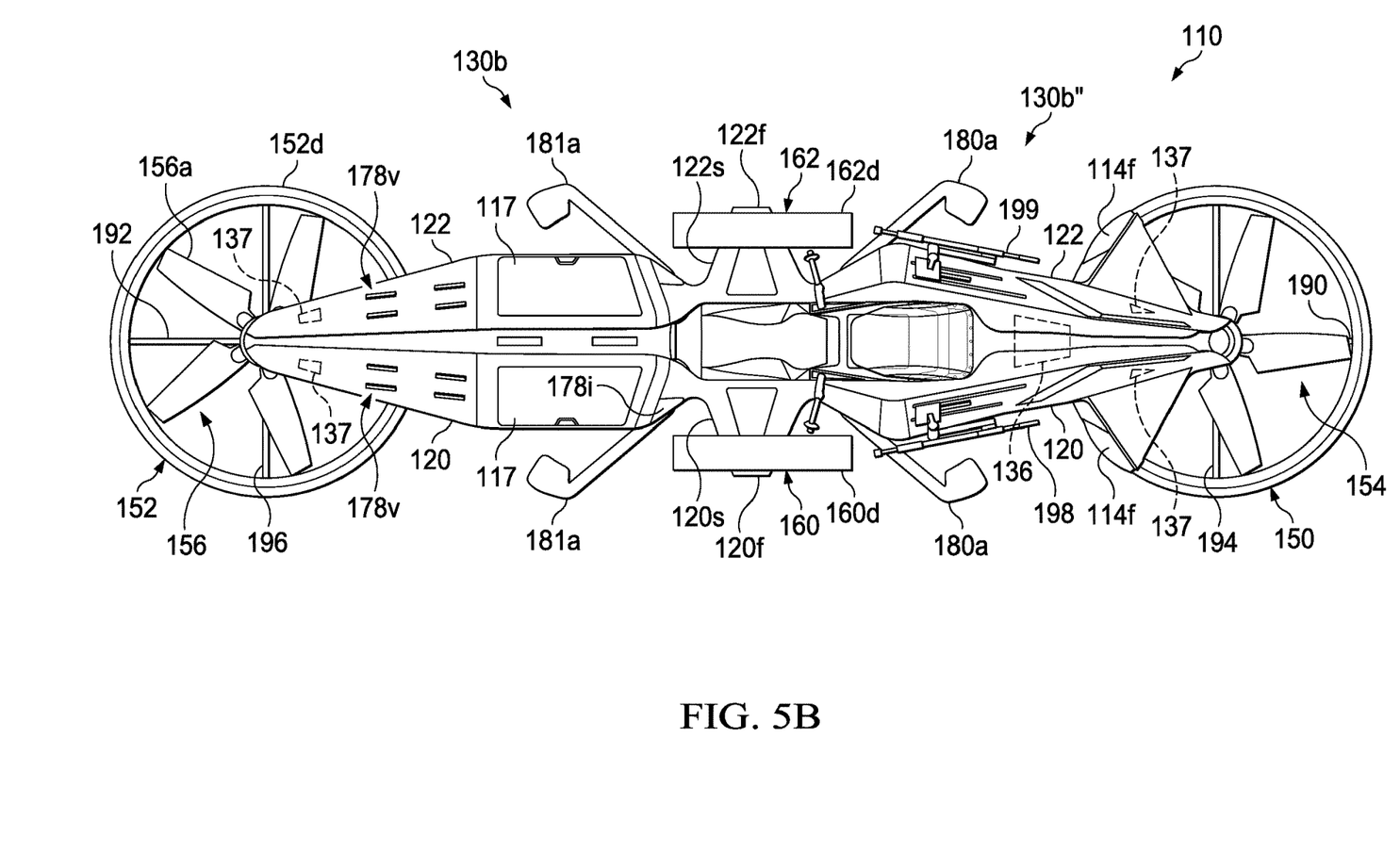
FIG. 5B is a top view of a personal air vehicle in a folded mode in accordance with exemplary embodiments of the present disclosure.

FIGS. 5A-5B shows a personal air vehicle 110. Certain features of personal air vehicle 110 are as described above and bear similar reference characters to personal air vehicle 10, but with a leading '1'. Personal air vehicle 110 includes secondary area 130*b"* adjacent to operator area 130*a* and on top of the forward portion 14. In the illustrative embodiment of FIG. 5A, the secondary area 130*b"* is used for storage of weapons 198, 199 on the right and left sides 120, 122. The secondary area 130*b"* is reachable by the operator. In an embodiment, the operator can lock the vehicle 110 in a hover mode using flight control system 136 and reach for weapons 198, 199 for a military or police mission whether the operator is on or remote from PAV 110.

In an embodiment, the flight control system 136 can include an automatic center of gravity (CG) adjustment in hover mode during firing of a weapon 198 by the operator or when PAV 110 encounters other CG modifiers; for example, and not limitation, wind, cargo, passengers, ballistic strike. In some embodiments, flight control system 136 can include hands-free landing and takeoff mode that can be particularly useful for ingress and egress in combat missions.

In an embodiment, flight control system 136 can provide situational information related to the flight, mission, and/or job to the operator when the operator is remote from PAV 10. An embodiment provides that PAV 10 can function as a lookout for the operator 30 when the operator is remote from PAV 10 (e.g., PAV 10 is located at a position above the operator to assess the terrain, operator's current location, and incoming targets that the operator cannot see while on the ground). When flight control system 136 identifies situational information, the information can be relayed to the operator and/or control personnel at a base or flight command center. In an embodiment, flight control system 136 can position PAV 110 to provide protection from a ballistic strike for the operator when the operator is remote from PAV 110 (e.g., using bullet resistant materials on the body 12 of PAV 10 and/or PAV 10 can be positioned by the flight control system 136 between the incoming ballistic material and the operator). In yet another embodiment, flight control system 136 can position PAV 110 to achieve ballistic requests made by the operator when remote from PAV 110 and/or control personnel at a base or flight command center.

In an embodiment, tilting ducted fans 160, 162 can be foldable into a reduced-space storage position, as shown in FIG. 5B. In an embodiment, each of tilting ducted fans 160, 162 can be folded along fold axis 121, 123, respectively. In some embodiments, each tilting ducted fans 160, 62 can be folded upward or downward along fold axis 121, 123 to reduce the width of PAV 110. Fold axes 121, 123 can be disposed on the respective support member 120s, 122s. In an embodiment, fold axes 121, 123 are disposed on support member 120s, 122s and inboard of flange 120f, 122f, respectively. In an embodiment, tilting ducted fans 160, 162 can be ganged together to provide for even folding. It should be understood that a wide variety of additional folding configurations for ducted fans 160, 162 and even ducted fans 150, 152 may be utilized, depending upon space requirements and applications.

While the illustrative embodiments are described as providing thrust for a personal air vehicle, the illustrative embodiments may also be scaled up for larger aircraft. In these alternative embodiments, there may be more or larger ducted fans in a variety of configurations to support the heavier aircraft.

The illustrative embodiments of the personal air vehicle with ducted fans described herein advantageously provide a hoverbike that can be used for military, police, and border patrol applications. Moreover, the illustrative embodiments of the personal air vehicle with ducted fans can provide at least one of the following advantages: easy to operate hoverbike; capable of transporting passengers, cargo, and/or data; and can be used for military, police, commercial, and residential applications.

At least one embodiment is disclosed and variations, combinations, and/or modifications of the embodiment(s) and/or features of the embodiment(s) made by a person having ordinary skill in the art is within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, Rl, and an upper, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 5 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrow terms such as consisting of, consisting essentially of, and comprised substantially of. Accordingly, the scope of protection is not limited by the description set out above but is defined by the claims that follow, the scope including all equivalents of the subject matter of the claims. Each and every claim is incorporated as further disclosure into the specification and the claims are embodiment(s) of the present invention.

The invention claimed is:

1. A personal air vehicle comprising:
a body having a forward end, a central portion and an aft end;
a first ducted fan including a front hub with a plurality of blade assemblies that extend radially to a front duct; the first ducted fan supported only at the top of the front hub by the forward end of the body;
a second ducted fan including a rear hub with a plurality of blade assemblies that extend radially to a rear duct; the second ducted fan supported only at the top of the rear hub by the aft end of the body;
third and fourth ducted fans supported by the left and right sides of the body and pivotable relative to the body; and
a flight control system operable to change at least one operating condition of at least one of the first, second, third, and fourth ducted fans.

2. The vehicle according to claim 1, wherein the third and fourth ducted fans are pivotable relative to the body in a horizontal orientation for a hover mode.

3. The vehicle according to claim 1, wherein the third and fourth ducted fans are disposed on the central portion of the body.

4. The vehicle according to claim 1, wherein at least one of the third ducted fan and the fourth ducted fan is adjacent to a bottom surface of the body.

5. The vehicle according to claim 1, wherein the third ducted fan and the fourth ducted fan are foldable.

6. The vehicle according to claim 1, wherein the vehicle is configured to generate roll control by selectively differentiating a collective power in the third and fourth ducted fans, in any combination so as to produce a desired differential in thrust angle between the right side and the left side of the vehicle.

7. The vehicle according to claim 1, wherein at least one of the first ducted fan, the second ducted fan, the third ducted fan, and the fourth ducted fan generates a variable thrust.

8. The vehicle according to claim 1, wherein the first ducted fan and the second ducted fan are each rotatable about an axis substantially perpendicular to the vehicle longitudinal axis.

9. The vehicle according to claim 1, wherein the axes of rotation of the third ducted fan and the fourth ducted fan are each pivotable about a pivot axis.

10. The vehicle according to claim 1, wherein the vehicle is wingless.

11. The vehicle according to claim 1, wherein the vehicle is configured to generate pitch and yaw control by selectively differentiating a collective power in the first ducted fan and the second ducted fan, in any combination so as to produce a desired differential in thrust angle between the forward and aft portions of the vehicle.

12. The vehicle according to claim 1, wherein at least one of the first ducted fan and the second ducted fan further comprising a pair of air directing slats for providing yaw control of the vehicle.

13. The vehicle according to claim 1, wherein the flight control system further comprising a hover hold mode.

14. The vehicle according to claim 1, wherein the body further comprises a retractable landing gear assembly.

15. The vehicle according to claim 14, wherein the landing gear assembly comprising a base and a pair of retractable arms extending from the base for contacting the ground.

16. The vehicle according to claim 1, further comprising:
an operator control device in communication with the flight control system and operable to receive a command from an operator.

17. The vehicle according to claim 16, wherein the operator control device is a pair of handle bar assemblies.

18. The vehicle according to claim 1, wherein the third and fourth ducted fans are pivotable relative to the body in a non-horizontal orientation.

19. The vehicle according to claim 18, wherein the non-horizontal orientation is in a forward mode.

20. The vehicle according to claim 18, wherein the non-horizontal orientation is in a reverse mode.

21. The vehicle according to claim 1, wherein the body further comprising an operator area and a secondary area.

22. The vehicle according to claim 21, wherein the secondary area supports at least one of the following: a passenger, cargo, a weapon, equipment, and combinations thereof.

23. The vehicle according to claim 21, wherein the secondary area is adjacent to the operator area.

24. The vehicle according to claim 21, wherein the secondary area is reachable by the operator.

25. The vehicle according to claim 21, wherein the operator area comprises a straddle seat for the operator.

26. A method of flying a personal air vehicle, the method comprising:
providing the vehicle of claim 1; and
producing using at least the first ducted fan and the second ducted fan a vertical thrust to cause the vehicle to ascend.

27. The method of claim 26, further comprising:
pivoting a pair of air directing slats on at least one of the first ducted fan and the second ducted fan to provide yaw control of the vehicle.

28. The method of claim 26, further comprising:
producing using the third ducted fan and the fourth ducted fan a vertical thrust to cause the vehicle to ascend.

29. The method according to claim 26, further comprising:
producing using the third ducted fan and the fourth ducted fan a forward thrust to cause the vehicle to move forward.

30. The method according to claim 26, further comprising:
producing using the third ducted fan and the fourth ducted fan a reverse thrust to cause the vehicle to move rearward.

31. The method according to claim 26, further comprising:
pivoting at least one of the third and fourth ducted fans to control at least one of the roll and yaw of the vehicle.

* * * * *